United States Patent [19]
Kemler

[11] 4,238,649
[45] Dec. 9, 1980

[54] CALL SIMULATOR

[75] Inventor: Marc Kemler, Meudon la Foret, France

[73] Assignee: Compagnie Industrielle des Telecommunications Cit-Alcatel, Paris, France

[21] Appl. No.: 928,029

[22] Filed: Jul. 25, 1978

[30] Foreign Application Priority Data

Aug. 8, 1977 [FR] France .................... 77 24346

[51] Int. Cl.$^3$ ............................. H04M 3/24
[52] U.S. Cl. ................. 179/175.2 D; 179/175.2 R
[58] Field of Search ......... 179/175, 175.2 R, 175.2 C, 179/175.2 D

[56] References Cited

U.S. PATENT DOCUMENTS

| 3,069,512 | 12/1962 | McAllister | 179/175.2 D |
| 3,497,639 | 2/1970 | Malinich et al. | 179/175.2 R |
| 3,700,830 | 10/1972 | Naylor et al. | 179/175.2 D |
| 3,952,172 | 4/1976 | Penn et al. | 179/175.2 R |
| 3,958,111 | 5/1976 | Hackett | 179/175.2 R |

FOREIGN PATENT DOCUMENTS

2269831  4/1974  France ........................ 179/175.2 D

Primary Examiner—Gerald L. Brigance
Attorney, Agent, or Firm—Sughrue, Rothwell, Mion, Zinn and Macpeak

[57] ABSTRACT

Traffic simulator for tandem exchange testing. The simulator comprises a calling side module (CAM) to simulate a calling exchange, with facilities for the selection of dialling information, type of test operation and signalling code and connected to the tandem exchange (CT) at an i/c circuit terminating equipment (JA) of a type suited to the selected signalling code; answering side module (CAV) to simulate a called exchange, connected to the tandem exchange at an o/g circuit terminating equipment (JD) and comprising means for selection of the signalling code for communication with said terminating equipment, said two modules being independent and signal flows between them passing exclusively through the tandem exchange.

13 Claims, 12 Drawing Figures

CALL SIMULATOR

The invention concerns a traffic simulator for tandem switching centers, and particularly telephone tandem centers. It can find applications in the telecommunications industries.

Many devices for the simulation of traffic in exchanges are already known. Relay circuitry test call devices were devised for electromechanical exchanges, but are relatively unreliable and unversatile. Computer controlled devices have been in existence for several years; such equipments possess many capabilities, but cannot always be used by reason of their cost and the skills they demand of operating staff.

British Pat. No. 1 477 102 describes a traffic simulator for testing an exchange. It generates a number of simultaneous test calls, and separates these calls into series of successively checked phases. It comprises a plurality of test equipments, each composed of analog circuits carrying out the functions of a calling and a called station, with logic circuits scanning the signals exchanged at each phase through the switched circuits interconnecting the two stations, and triggering a change in phase at signal reception.

The purpose of the present invention is the creation of a traffic simulator of this type, which is easy to use, and which is produced with inexpensive, standard integrated circuits to make it possible for the simulator to be used in testing tandem centers of any technology and with a wide choice in type of signalling.

The present invention provides a traffic simulator for simulating calls switched through a tandem exchange by simulating both the calling and the answering exchange sides of signalling with the tandem exchange, and in which the progress of a call is split into a succession of phases during which a connection is set up through the tandum exchange, speech between subscribers is simulated, and the connection is cleared, wherein the simulator comprises two independent modules, a calling side module connected to an in-coming circuit terminating equipment of the exchange to simulate signalling between a calling exchange and the tandem exchange via its incoming circuit connected to the incoming terminating equipment, and an answering side module connected to an outgoing circuit terminating equipment of the exchange to simulate signalling between the tanden exchange and an answering exchange, each of the modules comprising a central logic function for controlling the progress of a call and a fault analyser logic function for analysing the data received or transmitted at each of the phases to indicate faults.

Preferably the answering-side module has a terminating equipment logic unit capable of simulating the functions of a number of types of circuit terminating equipments of calling-side exchanges, a fault analysis logic monitoring transmitted and received signalling at each phase, and a numbering logic offering the possibility of transmitting digits selected at a group of thumbwheel selectors and stating the number of the wanted station.

An embodiment of the invention is described by way of example with reference to the accompanying drawings in which.

Figure 1:
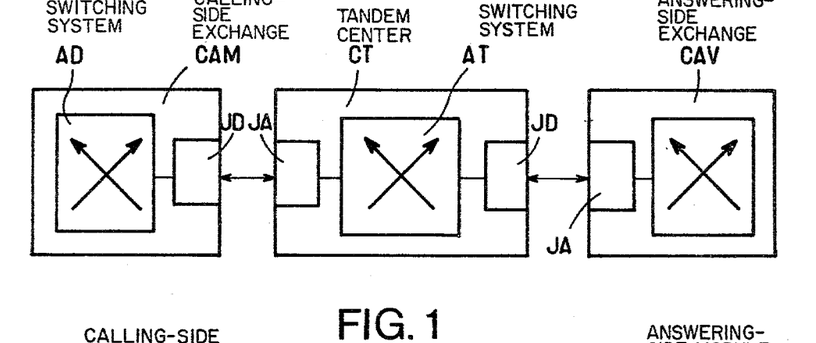
FIG. 1, which is a general schematic of the connection of two exchanges to a tandem center.

In the application to be described, the invention concerns a simulator for the testing of a tandem center CT (FIG. 1). The exchange has a switching system AT, and i/c and o/g circuit terminating equipments (junctors) JA and JD. The i/c line equipments are connected to the o/g line equipments JD of one or several calling-side exchanges CAM, and the o/g line equipments are connected to the i/c line equipments JA of one or several answering-side exchanges CAV. In this application (FIG. 2) the simulator comprises two modules, a calling-side module M1 and an answering-side module M2, plus a control station PC equipped with means for the control of call forwarding, such as the transmission of dialled information, selection of the status of the wanted station, display of the dialled information, etc. It is of evident interest to situate calling-side module M1 at the i/c line equipment level of the tested exchange, and the answering-side module at that of the o/g circuit terminating equipments. It will be necessary to connect a cable between the control station and each of the modules. In another form of the invention (FIG. 3), the control station is omitted, and controls are situated at each of the modules (PC1, PC2).

Figure 2:
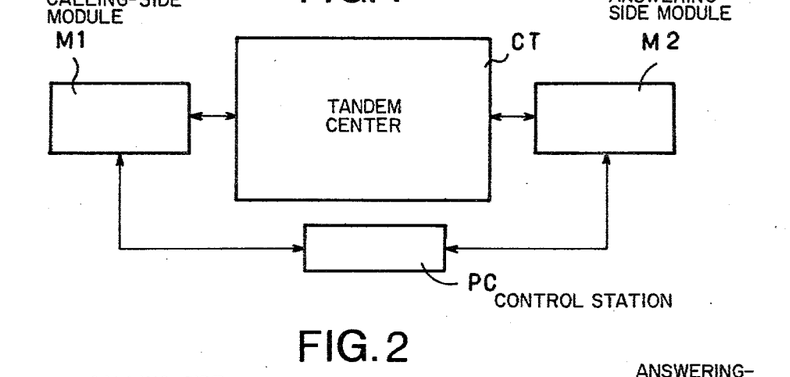
FIG. 2, which schematically shows the general organisation of a traffic simulator connected to a tandem center.
Figure 3:
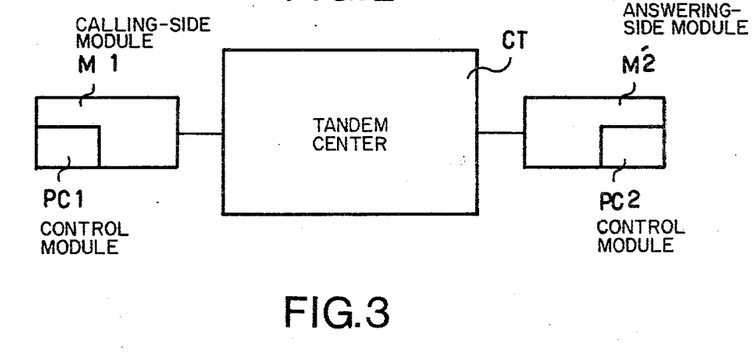
FIG. 3, which represents another organisation of a traffic simulator, in which controls are located at each of the modules.

What will now be described is the function and composition of each of the modules, with reference to the form of the invention represented by FIG. 2.

Figure 4:
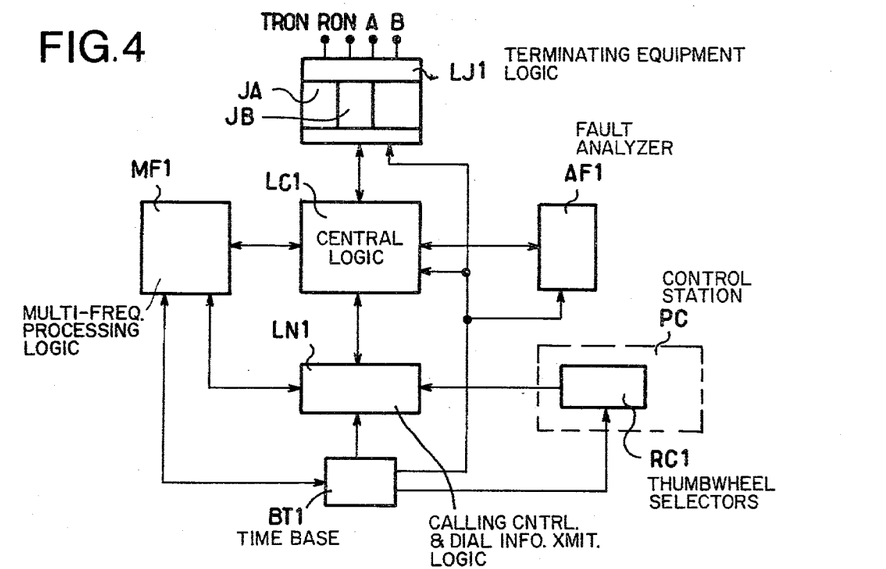
FIG. 4, which is a block diagram of a calling-side module.

The purpose of the calling-side module M1 is to busy the i/c circuit terminating equipment of the exchange and then to transmit dialled information for the setting up of a path between the i/c line equipment and o/g line equipment, and from there to the answering-side module M2. These functions are carried out by an assembly of electronic units and wired logic (FIG. 4).

The input to the module is on four wires connected to terminating equipment logic LJ1. These four wires are wire A, wire B, M signalling wire, and E signalling wire. Logic LJ1 comprises a number of line equipments JA, JB, etc., each suited to a type of signalling. Each of these line equipments has moreover an interface with a central logic LC1 for the digitizing of these signals, to permit their acquisition by central logic.

The purpose of central logic LC1 is to control the sequencing of call forwarding phases. In fact, it is well known that in testing exchanges, call forwarding is split into a number of phases each giving rise to an exchange and verification of signals. This is the case, in particular, in the main patent, which concerns a traffic simulator for the testing of exchanges at the local level. In the present invention, communications are divided into ten phases, as detailed in table 1.

A calling control and dial information transmitter logic LN1, a time base BT1, a fault analyser logic AF1, and a compelled multifrequency (CMF) processing logic MF1 are associated with said central logic.

Logic LN1 has a control and transmission function for numbering: the control function consists in calling and manual or automatic call repetition in the event of faults.

For its dial information transmission function, logic LN1 is connected to a set of thumbwheel selectors RC1, situated—for example—at the control station PC. Each thumbwheel is used to select one of the digits of the number to be transmitted. Power is connected in turn to each of the thumbwheels during the dialling sequence. As shall be seen later, logic LN1 has a thumbwheel address counter successively connecting logic LN1 to each thumbwheel. In decadic impulse signalling, the impulses are transmitted directly to the circuit terminating equipment used in the test by logic LN1, and recognition of an interval between pulse trains steps said counter. The thumbwheel address formed in the counter is compared with that formed in the sequential thumbwheel energizing device to initiate reading of the digit to be transmitted. In CMF, each digit for transmission is sent in binary to a logic unit MF1.

Said logic unit comprises a CMF transmitter and receiver, and logic circuitry for the handling of the CMF codes used. It also comprises means for analysis of the voice frequencies transmitted by the simulated wanted station, which simulate speech.

Fault analyser logic AF1 is equipped with means for analysis of exchanged signals at each phase, and a time-out counter, which is reset at each phase change.

A fault is signalled when expected signals in a given phase are not received within the selected time-out. According to the selected operating (automatic or manual call repetition on faults), signalling of a fault results either in display of the type of fault, and inhibition of the module, or recording of the occurrence and call repetition.

Figure 6:
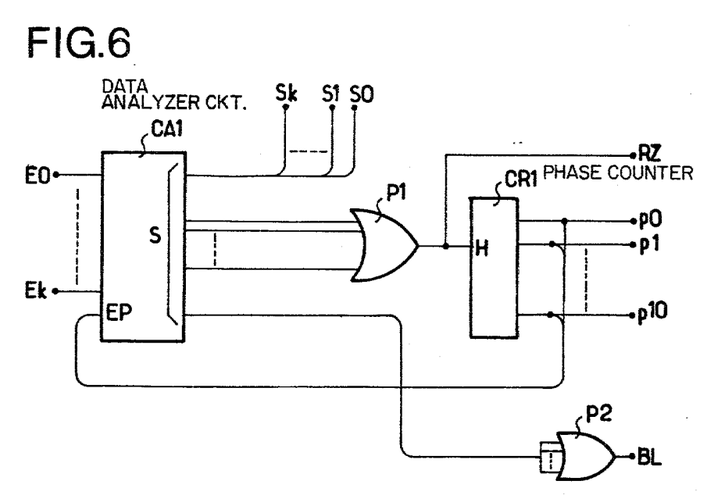
FIG. 6, which is a schematic of the central logic circuitry.

The logic circuitry used in the calling-side module is described further on with reference to FIG. 6.

Figure 5:
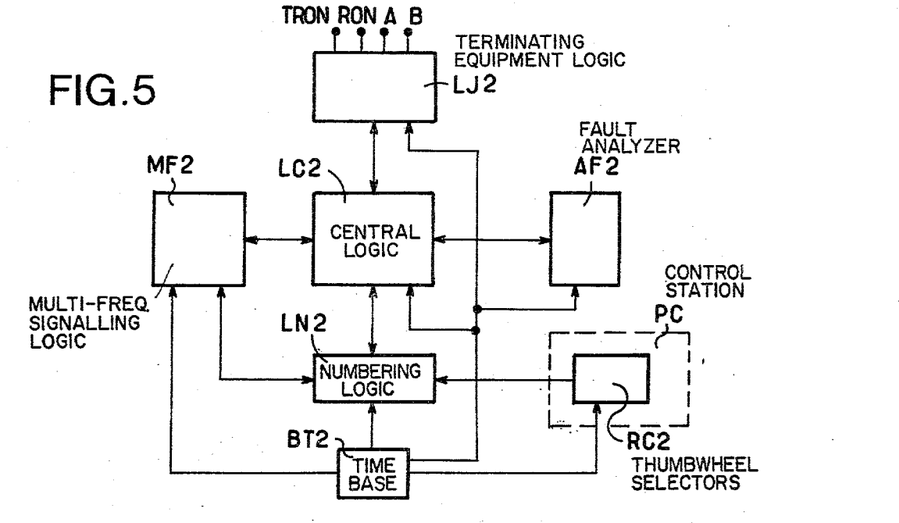
FIG. 5, which is a block diagram of an answering-side module.

The answering-side module is similar in construction to the calling-side module (FIG. 5).

Terminating equipment logic circuitry comprises a number of i/c circuit terminating equipments, each interfacing with a central logic LC2. The calling-side module also has fault analysis logic AF2, numbering logic LN2, multifrequency signalling logic MF2, and a time base BT2. In this module, logic LN2 is provided to scan and check the numbering information received from the calling-side module. It is also associated with a set of thumbwheel selectors RC2 at the control station, with which the number to be received is displayed. An additional thumbwheel is provided to display the number of digits to be received, thereby determining end of numbering, whatever the type of call originated by the calling-side module.

We shall now describe a number of the circuits used in the simulator according to the invention. Most of these are in the form of integrated circuits in CMOS technology, for example. Certain signals exchanged during the forwarding of a call will also be mentioned, but shall not give a complete listing of these signals, which vary according to codes and operating procedures, and are well known in each code.

In the calling-side module (FIG. 6) central logic comprises a data analysis circuit CA1, and a phase counter CR1. CA1 is a wired logic circuit receiving i/c data EO to EK from the terminating equipments of the numbering logic, of the multifrequency signalling logic and of the fault analyser, and from the time base. This wired logic is not described here in detail, its only functions being to perform logic equations on the basis of the i/c data, to derive output data. A description of a similar data analyser will be found in the patent already referred to by the applicant. Such a circuit comprises gates for acceptance of duration data.

A second group of inputs (EP) of CA1 is connected to outputs p0 to p10 of the phase counter. Circuit CA1 delivers several categories of output data. A number of status bits are sent to outputs SO to SK, which are connected to other components of the calling-side module. A number of outputs control phase changing: these are connected to the input of an OR gate P1, which drives the phase counter clock. The output of P1 is also connected to a point (RZ) for transmission of a reset command to the fault analyser.

A further group of CA1 outputs is connected to the input of OR gate P2, of which the output at point BL is used to inhibit the time-out circuit of the fault analyser.

Figure 7:
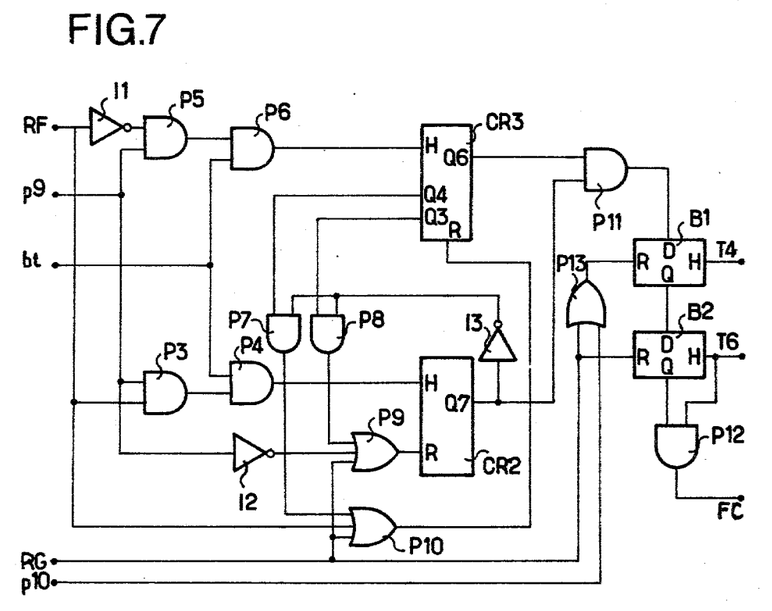
FIG. 7, which is a partial schematic of the analyser shown in FIG. 6.

A part of circuit CA1 is shown in FIG. 7 as an example. The circuit shown transmits an "end of conversation" signal (FC) which initiates switching from phase p9 to phase p10, that is to say, from the conversation phase to the clearing phase. This circuit receives signal RE from the terminating equipment, indicating that the latter is detecting the voice frequency representing speech. Signal FC is to be sent when signal RF has been detected for a time t1, and then has been absent for a second period of time t2. These durations are monitored by binary counters CR2 and CR3. The clocking inputs H of these counters receive counter stepping pulses from time base (bt) through a groupe of AND gates P3 to P6, thereby stepping the counters during phase p9.

Inverter I1 enables counter CR2 while signal RF is present, and enables counter CR3 whle this signal is absent. A set of gates P7 to P10 and inverters I1 to I13 control the reseting inputs of counters CR2 and CR3 in order to determine progression of the following sequence: switching to phase p9, reception of signal RF during a time t1 defined by switching to 1 of the weight 7 output of counter CR2, absence of signal RF, still in phase 9, during a time t2 determined by switching to 1 of weight 6 output of counter CR3. This out put and the weight 7 output of CR2 control AND gate P11, of which the output appears at point FC through two type D flip-flops in series (B1, B2) and an AND gate P12. The flip-flops synchronize signal FC with a signal transmitted by the time base. In the present application, the time base is equipped, for example, with a 10 kHz clock associated with a frequency divider producing 10 periods T1 to T10 for synchronization of the various components of the calling-side module. This divider is followed by a scale of 4-divider producing a 250 Hz signal driving the time-out counters (for example CR2 and CR3, and clocking signal at point bt). A general reset signal (RG) is connected to reset input R of flip-flop B2 and of flip-flop B1 through OR gate P13, of counters CR2 and CR3 through OR gates P9 and P10. Flip-flop B1 is also reset at the start of phase p10 (point P10 connected to an input of gate P13).

The fault analyser (FIG. 8) has a data analyser circuit CA2 of the same type as CA1 receiving inputs indicating phase switching p0 through to p10 on the one hand, and input data I0 to Ij from the terminating equipments of central logic, from the time base, plus data defining time-out durations from counter CR4. The outputs of CA2 state fault types and are connected on the one hand to fault display V, and on the other to an OR gate P14 driving fault counter CP1 and fault status storage flip-flop B3. CR4 is clocked by time base (BT2) through AND gate P15, controlled by two-input OR gate P16 through inverter 14. One of the inputs to P16 is connected to the output of flip-flop B3, and the other to central logic output point BL, which on switching to 1 inhibits counter CR4.

Figure 8:
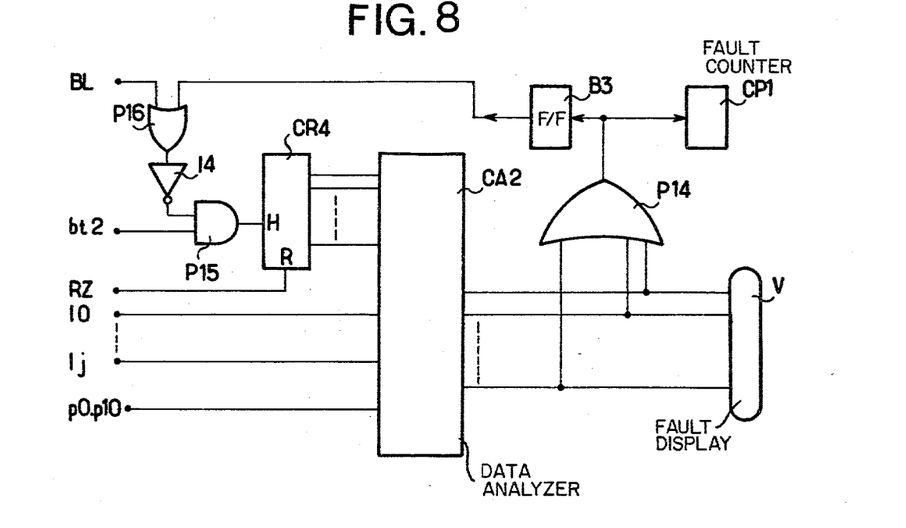
FIG. 8, which is a schematic of the fault analyser.

Counter CR4 is reset through point RZ by OR gate P1 (in FIG. 6), that is to say, at each phase change.

Figure 9:
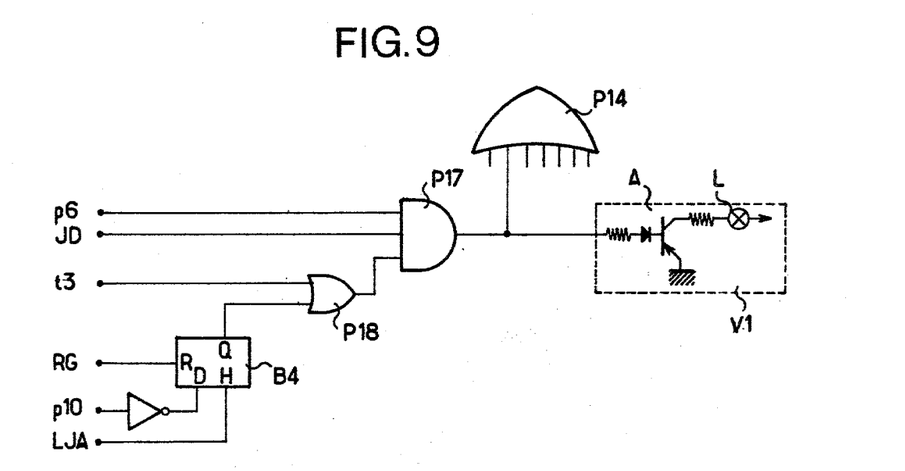
FIG. 9, which schematically represents the marking of a fault.

One of the functions of circuit CA2 is shown in FIG. 9. This function concerns marking of a fault in phase p6, namely failure to receive the end-of-dialling signal within the time-out t3, when a decadic impulsing terminating equipment is used. A 3-input AND gate is connected on the input side to the output p6 of phase counter CR1, a point JD of the control station at which use of a decadic impulsing terminating equipment is indicated, and the output of a two-input OR gate p18. One of the inputs of the latter is connected at point t3 to the output of counter CR4, for time-out t3, and the other input of gate p18 is connected to the Q output of a type D flip-flop B4. The purpose of the flip-flop is to store the clearing signal from the i/c terminating equipment LJA if this signal appears when it should not, namely during any phase other than phase p10. Input D of this flip-flop is connected to output p10 of the phase counter across an inverter I5. The output of gate P17 is connected at one of the inputs of gate P14, and to display unit v1, which comprises amplifier A and a lamp L.

Numbering logic NL1 (FIG. 10) transmits the number chosen with the thumbwheel selectors. In decadic impulsing, it transmits pulse trains, and in MF code it transmits the digits in binary coded decimal and in series to logic MF1.

Figure 10:
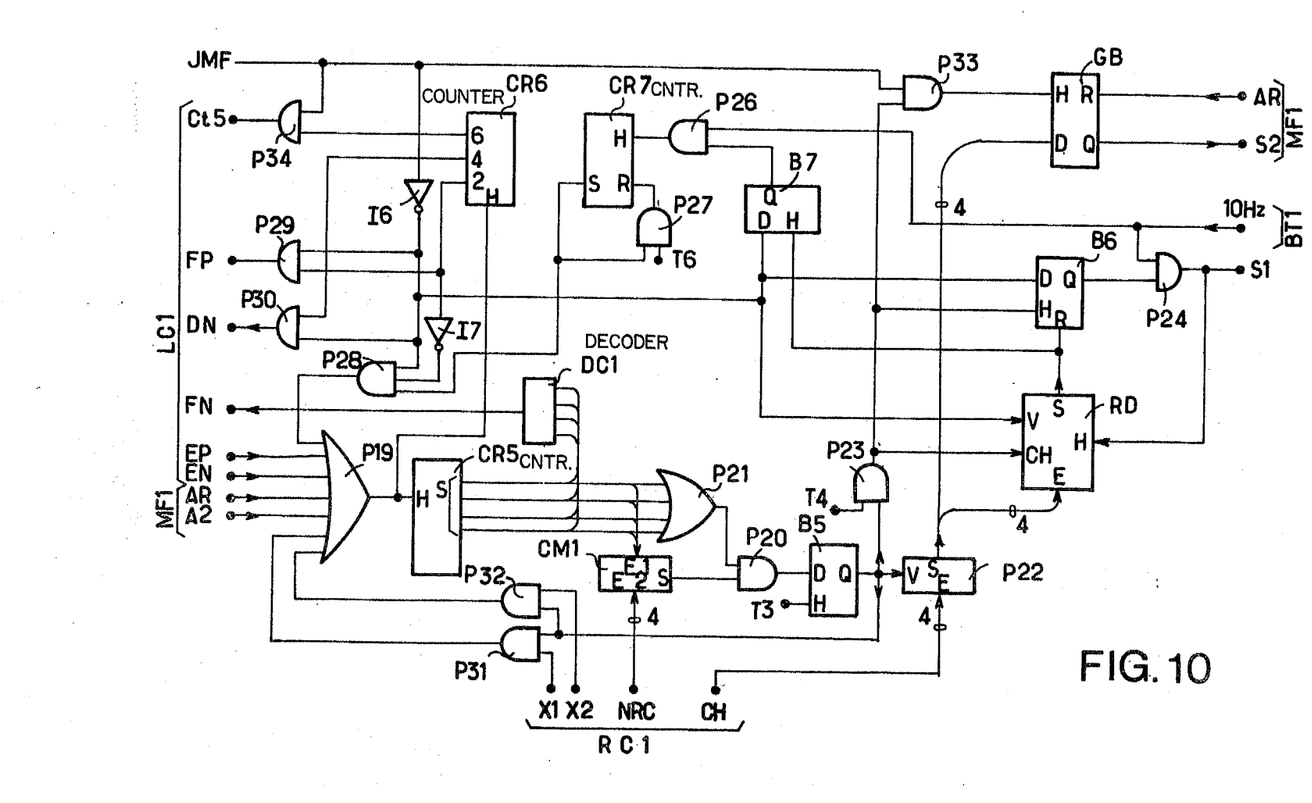
FIG. 10, which is a schematic of the numbering logic (LN1) in the calling-side module.

Logic LN1 comprises a thumbwheel address counter CR5 for reading in succession of each selector. Clock input H of this counter is supplied by OR gate P19, controlled by the stepping signals of the counter to be detailed further on. Address counter output S, which indicates the number of the thumbwheel to be read, is connected to one of the inputs E1 of a comparator CM1. A multiplexer, not shown, connects current to the thumbwheel selectors RC1 in succession, and the number formed by the selector receiving current at NRC is transmitted to input E2 of comparator CM1, of which output S delivers a 1 if both inputs are identical. This output is connected to an input of AND gate P20. The output of counter CR5 is also connected to an input of OR gate P21, of which the output enables P20 while CR5 is in a configuration other than 0. The output of gate P20 is connected to input D of flip-flop B5. The digit CH formed by the thumbwheel selector receiving current appears at the input to a set of gates P22, of which the enabling input V is controlled by the output of flip-flop B5; clock input H of the flip-flop is controlled by phase T3 of the time base. From the output of the set of gates P22, the digit received from the thumbwheel selector is transmitted to a set of flip-flops GB, used in MF signalling, and to the input of a count-down register RD, used in decadic impulsing.

A key is provided at the control station for selection of the type of circuit terminating equipment to be used. This key extends a 1 to the input JMF of logic LN1 when a CMF type terminating equipment is selected. Point JMF is connected through inverter I6 to the enabling input of register RD. Loading input CH of the register RD is connected to the output of AND gate P23, controlled by the output of flip-flop B5 and in phase T4 of the time base. Clock input H of register RD is controlled by AND gate P24, of which one of the inputs is a 10 Hertz signal from time base BT1. The other input of gate P24 is controlled by flip-flop B6. Output S of register RD, which goes to 1 when the register content becomes 0, is connected to the reset input R of flip-flop B6; the clock input of this flip-flop is connected to the output of gate P23, and its D input to the output of inverter I6.

In the application described, the last digit to be transmitted is always selected with the last thumbwheel. The output of counter CR5 is connected at the input of decoder DC1, signal FN indicating end-of-number from the output of the latter being transmitted to central logic LC1. The address of the thumbwheel with which the first dialled digit is selected, therefore depends on the length of the number. As we shall see further on, certain commands within logic LN1 or transmitted by this logic, depend on the numerical position of the digit just transmitted. A digit counter CR6 advancing in step with counter CR5 is therefore provided. Clock input H of this digit counter is connected to the output of gate P19. Further, in decadic impulse dialling, a train interval counter CR7 is used to step counter CR5 after each digit. Counting input H of counter CR7 receives a 10 Hertz signal from the time base through AND gate P26, connected at the output of flip-flop B7. Data input D of this flip-flop is connected to the output of inverter I6, and its clock input to output S of register RD. Output S of counter CR7, which goes to condition 1 at the end of a time period equal to a pulse train interval, is connected to resetting input R of the flip-flop through AND gate P27, enabled during phase T6 of the time base, and to the input of AND gate P28, which controls one of the inputs of gate P19.

Gate P28 has two other inputs, one connected to the output of inverter I6, and the other to output 2 of counter CR6 through inverter I7. Output 2 of counter CR6 assumes the 1 condition on transmission of the second digit, that is to say, at the end of the dialling code. In point of the fact, the purpose at this instant is to operate gate P19 with a special signal, and not with the pulse train interval. Output 2 of counter CR6 is also connected to the input of AND gate P29, enabled by the output of inverter I6. Gate P29 transmits an end-of-code signal to central logic LC1. Output 4 of counter CR6 is connected to the input of AND gate P30, also enabled by inverter I6. This gate sends a start-of-number signal DN to central logic LC1; signal DN is sent if the wanted subscriber's number has been selected with the thumbwheels following the fourth. Gate P19 also receives a code transmission signal EP and a numbering transmission signal EN from central logic, to step counter CR5.

Two other inputs of gate P19 are connected to logic MF1; one of these, AR, receives the digit acknowledged signal in MF code, after each digit has been sent. An input A2 receives a signal from the answering side, demanding transmission of all the digits not yet sent. In SOCOTEL MF code, this is signal A2. Finally, two inputs of gate P19 are connected to inputs X1 and X2 from the set of thumbwheel selectors, through AND gates P31 and P32. These gates are enabled by flip-flop B5. Input points X1 and X2 are in the 1 condition, respectively when the first or second thumbwheel has not selected a digit. Thus, when these thumbwheels are addressed by counter CR5, they transmit a signal to step the counter to the next thumbwheel, if there is no digit for transmission.

In MF signalling, the set of flip-flops GB provided for storage of the next digit to be sent, receives a clocking pulse from phase T4 of the time base, through AND gate P23, and a second AND gate P33, enabled by the signal at JMF. Output Q of the set of flip-flops is connected at point S2 into logic MF1. Reset input R of the set of flip-flops is connected into logic MF1 at point AR, at which the digit acknowledged signal that resets the flip-flops appears. Finally, AND gate P34 has its two inputs connected on the one hand to JMF, and on the other to output 6 of counter CR6. The output of gate P34 is connected to point cp5, at which stepping to phase 5 is initiated, into logic LC1. As shall be seen further on, the calling-side exchange (here the calling-side module) responds with a 4-digit code, in phase 4, to the "proceed to send" signal sent by the tandem center. Phase 4 therefore terminates on scanning of the sixth thumbwheel. In MF signalling, the digit acknowledged signal AR at the input to gate P19 is then inhibited in a manner not shown, by output 6 of counter CR6.

Figure 11:
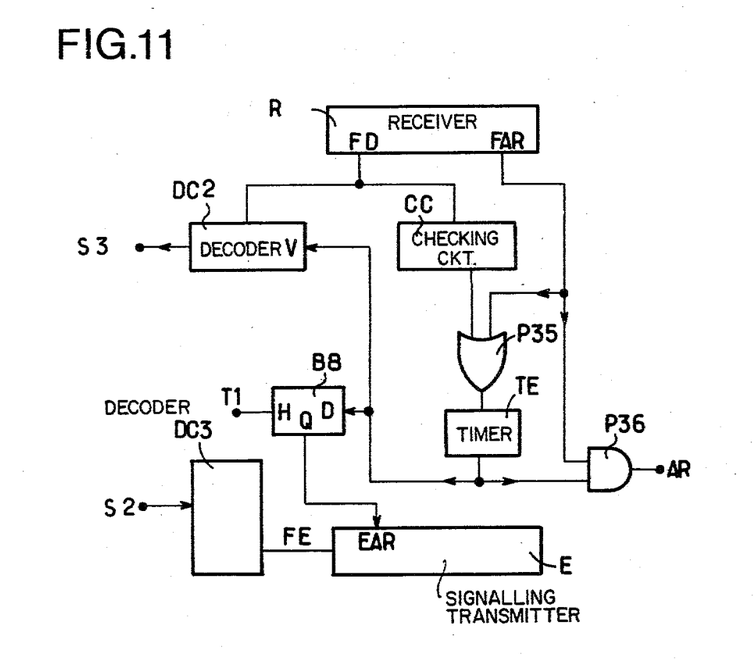
FIG. 11, which schematically represents the functions of the compelled multi-frequency signalling processing logic functions (MF1)

FIG. 11 is a block diagram of the main functions of logic MF1. The MF signals are received on the line wires by receiver R, and the frequencies detected are transmitted on the group of wires FD to checking circuit CC and decoder DC2. CC checks on the validity of the received signal, such as confirmed, for example, by the presence of two out of five frequencies in the SOCOTEL code. The output of this circuit is connected through OR gate P35 to timer TE monitoring for a minimum duration of the received signal. The timer output is connected to input D of flip-flop B8, operated in phase T1 of the time base. Output Q of the flip-flop B8 is connected to input EAR of a MF signalling transmitter E: input EAR triggers transmission of signal acknowledgement. A wire SAR connects receiver R to an input of gate P35; this wire carries condition 1 when the receiver detects an acknowledgement signal sent by the tandem center or answering-side exchange. This wire FAR is also connected to an input of AND gate P36, which is enabled by the output of timer TE. The output of gate P36 is connected at point AR into logic LN1 (FIG. 10). Circuit DC2 is provided to decode the received signal and to transmit it on a group of wires S3 as input data to logic circuits LC1, and LN1 at point S1.

The number to be transmitted and received from logic NL1 (point S2) is received by decoder DC3 and transmitted on the group of wires FE to transmitter E.

The structure of the answering-side module is fairly similar to that of the calling-side module, and the logic circuits used are of the same type in both modules. Numbering logic LN2 (shown in FIG. 12) is the only substantially different logic, its purpose being to scan the numbering information received and check its agreement with that transmitted by the calling-side module.

Figure 12:
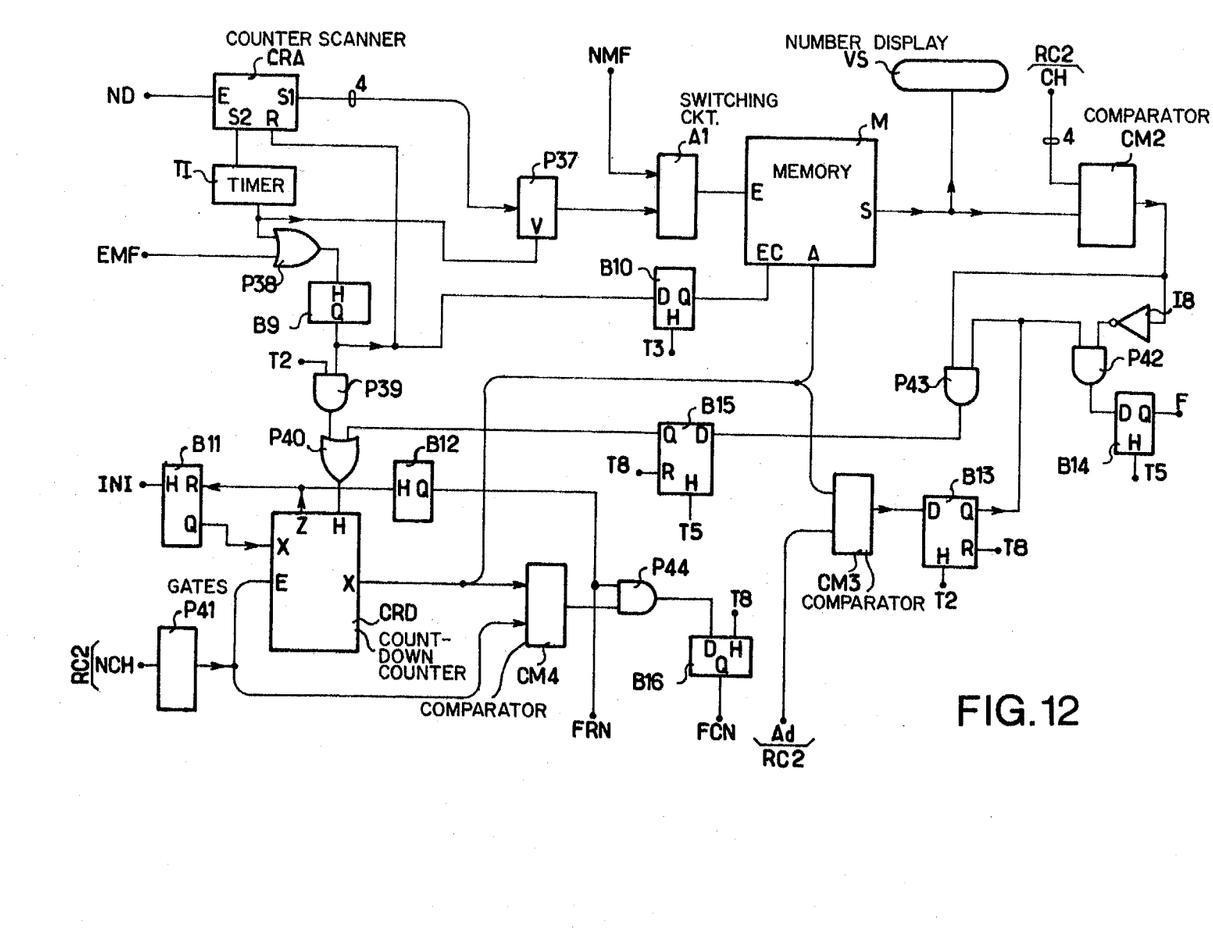
FIG. 12, which is a schematic of the numbering logic (LN2) in the answering-side module.

Logic LN2 received decadic impulsing pulses at a group of inputs ND, and MF numbering at the group of inputs MNF. The group of inputs ND is connected to input E of a counter-scanner CRA. In the known manner, such a device may be produced with a counter accociated with pulse clamping circuits. Output S1 of CRA delivers the digit scanned in binary form to a memory M through a set of gates P37 and input switching circuit AI, of which another input receives CMF numbering information (point NMF). A further output S2 of CRA switches to condition 1 on the trailing edge of the pulses appearing at point ND. Output 32 is connected to a timer T1 for detection of pulse train intervals. The output of T1 enables the set of gates P37 at input V, and is connected through OR gate P38 to the clock input of flip-flop B9, provided to store the pulse train interval. Output Q of flip-flop B9 resets CRA and is connected to the input of flip-flop B10, which controls the write input EC of memory M.

Time base BT2 of the answering-side module is similar to time base BT1: in particular, it comprises phases T1 to T10, appearing at the frequency of 1 kHz. Evidently, this time base is quite independent of the time base in the calling-side module. Flip-flop B10 is switched in phase T3 of the latter time base. Memory M can store the entire number: it is addressed by countdown counter CRD, provided to synchronise the scanning of the thumbwheels with that of the numbering information received from the calling-side module.

Clock input H of counter CRD is connected to the output of flip-flop B9 through AND gate P39, which is enabled at instant T2, and OR gate P40. As the number of digits to be received is variable, the option has been taken in this application of storing the last digit received in address 0. For this, and as shall be seen further on, counter CRD is initially loaded with the number of digits to be received, marked by a thumbwheel of the set RC2, the counter counting down as each digit is received. On reception of the last digit, the counter is again incremented up to its intially contained value, while checking agreement between the digits received and those selected at the thumbwheels.

The number of digits to be received is obtained from one of the thumbwheels on a group of inputs NCH, connected through a set of gates P41 to input E of counter CRD. Output S of the counter is connected to the addressing input A of the memory. Positioning input X of counter CRD, a function of the count or count-down, is connected at output Q of flip-flop B11, operated in turn by initiating signal INI from central logic.

Counter CRD also has an output Z which assumes the 1 condition in count-down, when the counter reaches value 0. This output Z resets flip-flop B11 and is connected to the control input of flip-flop B12. Output S of the memory is connected to number display VS and to the input of comparator CM2, of which the other input receives the digit selected by the thumbwheel receiving current at that instant, through point CH. As in the case of calling-side module, the thumbwheels receive current in sequence by a permanently stepping multiplexer. A further comparator CM3 monitors the synchronism of counter CRD with applications of current to the thumbwheels. One of the inputs to this comparator is connected to the output of counter CRD, the other input receiving address AD of the thumbwheel receiving current. The output of comparator CM3 is connected to the D input of flip-flop B13, provided to store the status of this synchronism, between phases T2 and T8 of the time base.

Detection of a numbering fault is stored by flip-flop B14, operated in phase T5. Input D of this flip-flop is connected to the output of AND gate P42, which is enabled by flip-flop B13 and comparator CM2 through inverter I8.

During the number scanning phase, stepping of counter CRT is controlled by flip-flop B15, of which output Q is connected to OR gate P40. This flip-flop is switched in phase T5, and reset in phase T8. Data input D of the flip-flop is connected to the output of AND gate P43, enabled by flip-flop B13 and comparator CM2. Logic LN2 also sends two signals to central logic; signal FRN on reception of a complete number, and which is delivered at output Q of flip-flop B12, and signal FCN, which indicates that the number check has been completed. The latter signal is sent when counter CRD has been reloaded to its initially loaded content. For this, comparator CM4 is connected at the outputs of counter CRD and set of gates P41. Signal FCN is stored by flip-flop B16, switched in phase T8, and of which data input D is connected to the output of flip-flop B12 and that of comparator CM4, through AND gate P44.

We shall now describe operation of the simulator according to the invention on two types of call, with reference to table 1 which shows the operating phases, and to tables 2 and 3, which show the signals exchanged between the calling-side module, telephone exchange, and answering-side module, respectively in the case of communication with decadic impulse signalling, and with MF signalling.

At the start, the modules are connected to circuit terminating equipments of the exchange. A type of in-coming terminating equipment and out-going terminating equipment are selected, and corresponding terminating equipments are selected in the modules, using the keys provided. The in-coming and out-going terminating equipments may be of different types, this being evidently essential for simulation of all real cases. The number of the wanted subscriber and the number of digits are determined by setting the thumbwheels of the modules which are then switched on. A mode of operation, such as a free or busy wanted party, congestion, or calling or called party release, is also selected.

The calling-side module is triggered to make the call, the answering-side module remaining in the waiting condition, until activated by the exchange. Triggering the call causes progression from phase p0 to phase p1, and may be manual or automatic if it is desired to repeat calls on termination or on faults, so as to measure grade of service. Seizing the in-coming terminating equipment causes progression to phase p2 of the calling-side module, and the starting of a time-out in logic AF1.

Reception of a connection test signal from the telephone exchange causes progression to phase p3, and resets the time-out. If the time-out runs out before appearance of the test signal, logic AF1 faults the module.

The proceed-to-send signal is received in phase p3 (IT, in table 2), thereby indicating that the register in the exchange is ready to receive signalling information. A time-out is also started, and a fault in this phase may result either in runout of the timer, or in reception of a clearing signal from the in-coming terminating equipment.

Further operation will be described with reference in the first instance to decadic impulsing, and in the second with reference to MF signalling. In decadic impulsing, a code is sent in phase p4 if the call is a trunk call. Stepping to phase p5 is triggered by signal FP at the end of the code (FIG. 10). A signal demanding transmission of the complete national number is expected from the exchange in phase p5, with again the possibility of faulting by time-out or by release of the in-coming terminating equipment. If the call is regional, that is to say without a code signal FP is nonetheless sent as indicated in the description of the numbering logic, stepping of the thumbwheel address counter CR5 being obtained by signals X1 and X2 from the thumbwheels. In phase p6, the number is transmitted and operation of logic LN1 is tested by detection of the end-of-number signal FN, which must appear within the period of a time-out started at the start of the phase.

On receiving the number, the exchange initiates seizing of an out-going terminating equipment and that of the terminating equipment in the answering-side module. The latter has only been partially described, owing to its similarity to the calling-side module, and in what follows we shall limit description to the exchange of signals between the exchange and calling-side module, without indicating answering-side phases.

After circuit testing by the answering-side module and transmission of proceed-to-send, the number is sent by the exchange to the answering-side module. This returns the wanted party free or busy signal, which is retransmitted by the exchange to the calling-side module.

Reception of this signal in phase p7 causes stepping to phase p8. In phase p7, faulting may result either on failure to receive the signal, or if the signal received is not in agreement with the mode of operation selected at the outset.

The called party answering signal is expected in phase p8. Its reception causes progression to phase p9, used for transmission of a voice frequency signal backwards from the answering-side module. Detection of the disappearance of the voice frequency signal steps the system to phase p10, in which clearing follows, whether by the calling or called party.

We shall now describe a call with MF signalling, referring to table 3. In this code, the proceed-to-send signal received in phase 3 is the signal (A1) which requests transmission of the regional or national access code and first four digits of the wanted number. This information, selected with the six first thumbwheels, is transmitted in phase p4, progression to phase p5 being triggered by signal Cp5 (FIG. 10). The signal requesting transmission of the last digits (A2) or all digits (A6) or indicating congestion (A9) is received in phase p5. The operation of the module in all the other phases is identical to its operation in decadic impulse signalling.

The splitting of call progress into phases is the same as described in the aforementioned British Pat. No. 1,477,102. Using a technique similar to that described in said patent, it is possible to use several modules according to the invention in synchronism, triggering certain phase changes exclusively on reception of a signal by all the modules. This provides call concentration.

Evidently, the invention is not restricted to the form described: the functions produced may be produced with equivalent means. In particular, the logic functions produced in the form of integrated circuits could be performed with programmed logic circuits. Further, the invention is equally applicable to other signalling methods, and other types of operation, suited to the tandem switching center being tested.

TABLE 1

Call progressing in the calling-side module

| Phase | Operation | Faulting On time-out | Faulting On release i/c T.E. |
|---|---|---|---|
| $p^0$ | System idle: call made | | |
| $p^1$ | Seizing of i/c term. eqt. of exchange | | |
| $p^2$ | Circuit test | X | |
| $p^3$ | Proceed-to-send received | X | X |
| $p^4$ | Prefix/access code + 4 digits sent | X | X |
| $p^5$ | Trunk dialling tone or "selection" code received | X | X |
| $p^6$ | Number sent: end of numbering test (signal FN) | X | X |
| $p^7$ | Busy or free code received Modes: Busy | X | |
|  | Free | X | X |
| $p^8$ | Wanted party response signal received | X | X |
| $p^9$ | Speech simulation: about 700 Hz reception 1900 Hz | X | X |
|  | detection of frequency cutoff in SEND and RCV | X | X |
| $p^{10}$ | Clearing: Modes: Called party release | X | |
|  | Detection term. eqt. release | | |
|  | Calling party release | X | |

TABLE 2

Signalling exchange between modules and exchange in decadic impulsing

Mode: Called party free
Called party release

| Calling-side module Signal | Phase | Tandem exchange | Answering-side module |
|---|---|---|---|
| Seizing → | $p^1$ | | |
|  | $p^2$ | ←Circuit test | |
|  | $p^3$ | ←Proceed to send | |
| Code → | $p^4$ | | |
|  | $p^5$ | ←Trunk dialling tone | |
| Number → | $p^6$ | | |
|  | | Seizing → | ← Circuit test |
|  | | | ← Proceed to transmit |
|  | | Number → | |
|  | | | Number scan |
|  | $p^7$ | ←— | ← Called party free |
|  | $p^8$ | ←— | ← Called party response |
| transmission 700 Hz → | $p^9$ | →→ | Frequency test |
|  | | | ← Transmission 1900 Hz |
| Frequency test Cutoff 700 Hz → Detection | | | Detection |
|  | | | ← Cutoff 1900 Hz |
| T.E. Clearing | $p^{10}$ | ←Clearing | ← On-hook |

TABLE 2-continued

Signalling exchange between modules and exchange in decadic impulsing

Mode: Called party free
Called party release

| Calling-side module Signal | Phase | Tandem exchange | Answering-side module |
|---|---|---|---|
| On-hook | | | |

TABLE 3

Same sequence as in table 2, but MF signalling

| Calling-side module Signal | Phase | Tandem Exchange | Answering-side module |
|---|---|---|---|
| Access code + 4 digits → | $p^4$ | | |
|  | | Seizing → | |
|  | | | ←— Circuit test |
|  | $p^5$ | ←— | ←— Proceed to send |
| Retransmission 4 digits → | $p^6$ | →→→ | |
|  | | | ←— Request last digits |
|  | | ←— | |
| Last digits → | | →→ | |

I claim:

1. A traffic simulator for simulating calls switched through a tandem exchange by simulating both the calling and the answering exchange sides of signalling with the tandem exchange, wherein the progress of a call is divided into a succession of phases during which (i) a connection is set up through said tandem exchange, (ii) a speech between subscribers is simulated, and (iii) the connection is cleared, wherein said simulator comprises:

an independent calling side module connected to in-coming circuit terminating equipment of said tandem exchange, said calling side module simulating signalling between a calling exchange and said tandem exchange via an incoming circuit connected to said in-coming circuit terminating equipment;

and an independent answering side module connected to outgoing circuit terminating equipment of said tandem exchange to simulate signalling between said tandem exchange and an answering exchange;

each of said calling and answering side modules being entirely independent from one another, whereby communication between said calling and answering side modules being exclusively through said tandem exchange, each said modules individually comprising central logic function means for controlling the progress of a call and fault analyser logic function means for analysing data received or transmitted at each of said phases to indicate faults.

2. A traffic simulator according to claim 1 wherein at least one of said calling and answering side modules includes numbering logic means for selecting different digits and signalling codes used by said tandem exchange to establish connections between said incoming and outgoing circuit terminating equipment to which said modules are connected.

3. A traffic simulator according to claim 1 wherein both the calling and answering side modules further comprise:

time base generator means;

numbering logic means for selecting different digits and signalling codes used by said tandem exchange;

and means for receiving multi-frequency signals and for determining the presence of selected frequencies in said multi-frequency signal.

4. A traffic simulator according to claim 3 wherein said central logic function means of said calling side module further comprises analyzing logic function means (CA1) for receiving data from (i) said number logic means, (ii) said means for receiving multi-frequency signals, (iii) said fault analyzer means, and (iv) said time base generator means, said analyzing logic function means providing said succession of phases.

5. A traffic simulator according to claim 3 wherein said fault analyzer logic function means of said calling side module is comprised of;

a time-out counter for receiving a signal from said time base generator means for providing a time-out duration signal;

a fault data analyzer means (CA2) receiving (i) signals from said central logic function means including an indication of said phases, and (ii) said time-out duration signal, said fault data analyzer means providing (i) an indication of fault type to a fault display, (ii) a signal to fault counter means, and (iii) a signal to storage means for selectively disabling said time-out counter.

6. A traffic simulator for simulating calls switched through a tandem exchange by simulating both the calling and the answering exchange sides of signalling with the tandem exchange, wherein the progress of a call is divided into a succession of phases during which (i) a connection is set up through said tandem exchange, (ii) speech between subscribers is simulated, and (iii) the connection is cleared, wherein said simulator comprises:

an independent calling side module connected to incoming circuit terminating equipment of said tandem exchange, said calling side modules simulating signalling between a calling exchange and said tandem exchange via an incoming circuit connected to said incoming circuit terminating equipment;

and an independent answering side module connected to outgoing circuit terminating equipment of said tandem exchange to simulate signalling between said tandem exchange and an answering exchange;

each of said calling and answering side modules being entirely independent from one another, and each individually comprising central logic function means for controlling the progress of a call and fault analyzer logic function means for analyzing data received or transmitted at each of said phases to indicate faults;

said calling side module further comprising:

time base generator means;

numbering logic means for selecting different digits and signalling codes used by said tandem exchange;

means for receiving multi-frequency signals and for determining the presence of selected frequencies in said multi-frequency signal;

wherein said central logic function means of said calling side module further comprises analyzing logic function means for receiving data from (i) said numbering logic means, (ii) said means for receiving multi-frequency signals, (iii) said fault analyzer means, and (iv) said time base generator means, said analyzing logic function means providing said succession of phases.

7. A traffic simulator for simulating calls switched through a tandem exchange by simulating both the calling and the answering exchange sides of signalling with the tandem exchange, wherein the progress of a call is divided into a succession of phases during which (i) a connection is set up through said tandem exchange, (ii) speech between subscribers is simulated, and (iii) the connection is cleared, wherein said simulator comprises:

an independent calling side module connected to incoming circuit terminating equipment of said tandem exchange, said calling side modules simulating signalling between a calling exchange and said tandem exchange via an incoming circuit connected to said incoming circuit terminating equipment;

and an independent answering side module connected to outgoing circuit terminating equipment of said tandem exchange to simulate signalling between said tandem exchange and an answering exchange;

each of said calling and answering side modules being entirely independent from one another, and each individually comprising central logic function means for controlling the progress of a call and fault analyzer logic function means for analyzing data received or transmitted at each of said phases to indicate faults;

said calling side module further comprising:

time base generator means;

numbering logic means for selecting different digits and signalling codes used by said tandem exchange;

means for receiving multi-frequency signals and for determining the presence of selected frequencies in said multifrequency signal;

wherein said fault analyzer logic function means of said calling side module is comprised of a time-out counter for receiving a signal from said time base generator means for providing a time-out duration signal;

fault data analyzer means receiving (i) signals from said central logic function means including an indication of said phases, and (ii) said time-out duration signal, said fault data analyzer means providing (i) an indication of fault type to a fault display, (ii) a signal to fault counter means, and (iii) a signal to storage means for selectively disabling said time-out counter.

8. A traffic simulator according to claims 1, 6 or 7 wherein said calling-side moudle includes circuit terminating equipment logic function means for simulating the operation of different types of outgoing circuit terminating equipment of calling exchanges connected to said tandem exchange.

9. A traffic simulator according to claims 1, 6 or 7 wherein said answering side module includes circuit terminating equipment logic function means for simulating the operation of different types of incoming circuit terminating equipment of answering eschanges connected to said tandem exchange.

10. A traffic simulator according to claims 1, 6 or 7 comprising in the calling-side module a set of thumb-wheel selectors (RC1) each for determination of one of the digits to be dialed and connected to numbering logic function means (LN1), means (CR5, CM1) for addressing of said thumbwheel selectors and acceptance of each of said digits, means for transmission of said digits to be dialed (RD, B6, GB), and means for monitoring (B7, CR6, CR7, P28, P19) of the transmission of each successive digit.

11. A traffic simulator according to claim 10 wherein digits are transmitted in the form of decadic impulses by control of the transmitted numbering information pulses delivered by the time base through an AND gate (P24) by means of a count-down register (RD) receiving the digit for transmission, said time base pulses stepping said count-down register in such a manner as to pass only the number of impulses matching the digit selected by the thumbwheel being read, said numbering logic function means further comprising a duration counter (CR7) for detecting pulse train intervals and triggering the stepping of means for addressing said thumbwheel selectors.

12. A traffic simulator according to claims 2, 6 or 7 wherein said answering side module comprises, a set of thumbwheel selectors (RC2) with which the number to be received by the answering-side module is set, and said numbering logic means (LN2) comprises (i) a memory (M) for storage of all received digits, said memory addressed by an address memory counter (CRD), and (ii) means for comparing the digits received and the number set with the thumbwheel selectors.

13. A traffic simulator according to claim 12 wherein said address memory counter (CRD) is counted down as a number is received, wherein once the entire number has been received, said address memory counter (CRD) counts up to its initially loaded value, under the control of said means for comparing, thereby verifying each received digit against the digit set with the corresponding thumbwheel selector.

* * * * *